(12) United States Patent
Zhang et al.

(10) Patent No.: US 12,299,037 B2
(45) Date of Patent: May 13, 2025

(54) GRAPH-BASED FEATURE ENGINEERING FOR MACHINE LEARNING MODELS

(71) Applicant: PAYPAL, INC., San Jose, CA (US)

(72) Inventors: Haoran Zhang, Shanghai (CN); Pengshan Zhang, Shanghai (CN); Junshi Guo, Shanghai (CN); Changle Lian, Shanghai (CN); Xiaojun Luan, Shanghai (CN); Xia Zhang, Shanghai (CN); Yu Zhang, Shanghai (CN); Jiaxin Fang, Shangahi (CN)

(73) Assignee: PAYPAL, INC., San Jose, CA (US)

( * ) Notice: Subject to any disclaimer, the term of this patent is extended or adjusted under 35 U.S.C. 154(b) by 59 days.

(21) Appl. No.: 17/882,350

(22) Filed: Aug. 5, 2022

(65) Prior Publication Data

US 2024/0045907 A1    Feb. 8, 2024

(51) Int. Cl.
*G06F 16/901* (2019.01)
*G06F 16/242* (2019.01)
*G06N 20/20* (2019.01)

(52) U.S. Cl.
CPC ...... *G06F 16/9024* (2019.01); *G06F 16/2428* (2019.01); *G06N 20/20* (2019.01)

(58) Field of Classification Search
CPC .. G06F 16/9024; G06F 16/2428; G06N 20/20
USPC ........................................................ 707/798
See application file for complete search history.

(56) References Cited

U.S. PATENT DOCUMENTS

| | | | |
|---|---|---|---|
| 2002/0040357 A1* | 4/2002 | Miller | G06V 10/94 706/20 |
| 2016/0012151 A1* | 1/2016 | Muchinsky | G06F 16/25 707/748 |
| 2020/0226512 A1* | 7/2020 | Epstein | G06Q 30/02 |
| 2021/0073284 A1* | 3/2021 | Hunter | G06F 21/64 |
| 2021/0192371 A1* | 6/2021 | Tago | G06N 20/00 |
| 2022/0014422 A1* | 1/2022 | Gupta Hyde | H04L 41/16 |
| 2022/0245013 A1* | 8/2022 | Ciabarra, Jr. | G06F 11/3438 |
| 2022/0284362 A1* | 9/2022 | Bellinger | G06Q 10/063 |
| 2022/0358023 A1* | 11/2022 | Moser | G06F 11/079 |

(Continued)

OTHER PUBLICATIONS

PCT/US2023/027649, International Search Report and Written Opinion mailed Oct. 19, 2023; 10 pages.

*Primary Examiner* — Amy Ng
*Assistant Examiner* — Abdullah A Daud
(74) *Attorney, Agent, or Firm* — Haynes and Boone, LLP

(57) ABSTRACT

Methods and systems are presented for assisting a user to identify and evaluate features for use in a machine learning model configured to perform a task. Based on graph data associated with a graph data structure, a user interface is provided on a device. Based on user inputs received via the user interface, a feature candidate for the machine learning model is determined. The feature candidate is associated with a particular way of traversing the graph data structure to obtain attribute values associated with one or more vertices and/or one or more edges in the graph data structure. Based on the attribute values, a value corresponding to the feature candidate can be calculated. The value can be used to evaluate the effectiveness of the feature candidate in performing the task. The feature candidate can then be incorporated into the machine learning model as one of the input features.

20 Claims, 8 Drawing Sheets

(56) References Cited

U.S. PATENT DOCUMENTS

2023/0143291 A1* 5/2023 Peng .................... G06N 3/04
717/146
2023/0403652 A1* 12/2023 Ickin ................ H04W 52/0274

* cited by examiner

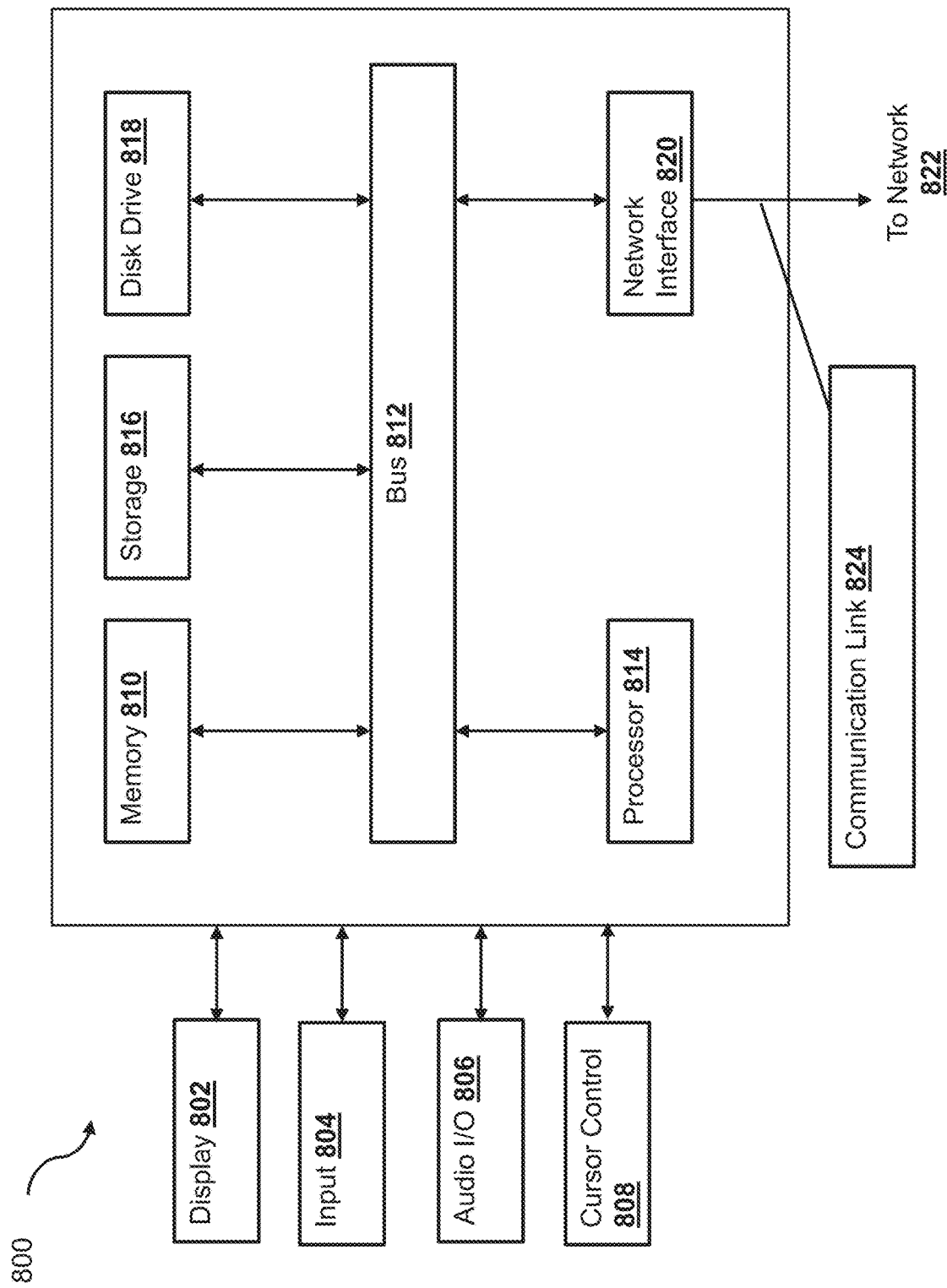

GRAPH-BASED FEATURE ENGINEERING FOR MACHINE LEARNING MODELS

BACKGROUND

The present specification generally relates to machine learning models, and more specifically, to providing a tool for analyzing and evaluating features for use in a machine learning model according to various embodiments of the disclosure.

RELATED ART

Machine learning models have been widely used to perform various tasks for organizations. For example, machine learning models may be used in classifying data (e.g., determining whether a transaction is a legitimate transaction or a fraudulent transaction, determining whether a merchant is a high-value merchant or not, determining whether a user is a high-risk user or not, etc.). To construct a machine learning model, a set of input features that are related to performing a task associated with the machine learning model are identified and defined. Training data that includes attribute values corresponding to the set of input features and labels corresponding to pre-determined prediction outcomes may be provided to train the machine learning model. Based on the training data and labels, the machine learning model may learn patterns associated with the training data, and provide predictions based on the learned patterns. For example, new data (e.g., transaction data associated with a new transaction) that corresponds to the set of input features may be provided to the machine learning model. The machine learning model may perform a prediction for the new data based on the learned patterns from the training data (e.g., whether the new transaction is a legitimate transaction or not, etc.).

While machine learning models are effective in learning patterns and making predictions, they are limited to the input features identified at the time of construction. When a set of input features selected for a machine learning model is highly relevant to the task performed by the machine learning model (e.g., highly related to the prediction performed by the model), the machine learning model can be trained to perform the task with high accuracy. Conversely, when the set of input features selected for the machine learning model is not relevant to the task, the machine learning model would likely perform the task poorly (e.g., inaccurate prediction), even with a large amount of training data. To further complicate the problem, data trends and patterns shift frequently, such that a feature that was determined to be highly relevant to performing the task some time ago may no longer be relevant, and a feature that was determined to be not relevant to performing the task before may become relevant. Thus, there is a need for providing a computer-based tool for efficiently identifying and evaluating features for machine learning models.

BRIEF DESCRIPTION OF THE FIGURES

FIG. 8 is a block diagram of a system for implementing a device according to an embodiment of the present disclosure.

Figure 1:
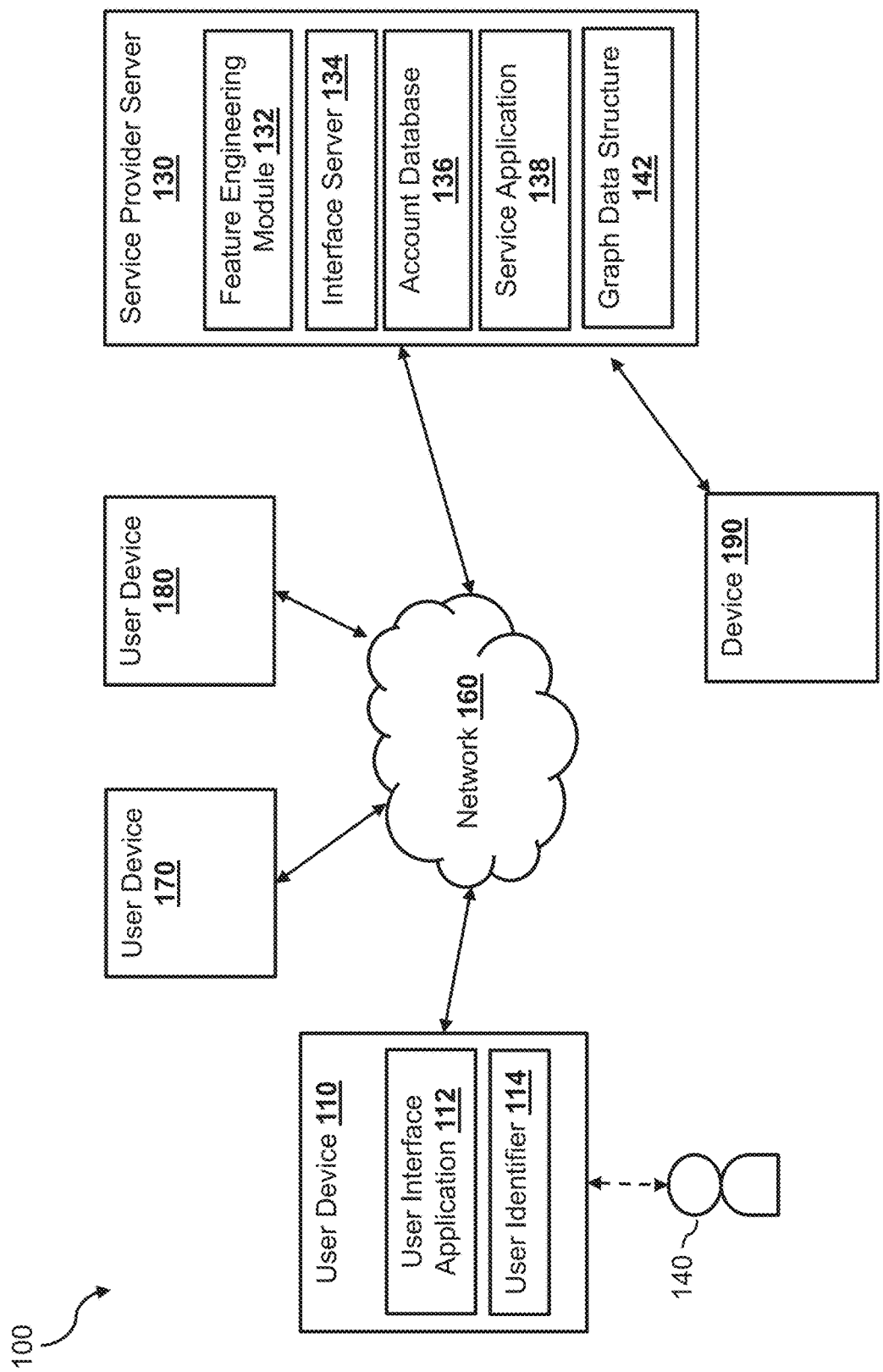
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a computer-based tool for identifying and evaluating features for use in a machine learning model. As discussed herein, selecting high quality input features for a machine learning model, which process is also known as "feature engineering," is crucial to improving performance of the machine learning model. However, feature engineering is a complex process that conventionally requires experts across different domains, such as data scientists, specialized software programmers, etc., to work together for an extended period of time to generate and test different feature candidates. The process is further complicated when the data that can be used to identify features is embedded within a graph structure.

Many organizations have adopted the use of graph structures for storing data. Graph structures are a type of data structure that uses vertices to represent different entities. The vertices can be connected with each other based on one or more types of relationships. As such, storing data in a graph structure is advantageous for illustrating relationships among different entities. For example, a social media platform can use a graph structure to represent the different users and the relationships among the different users with the social media platform. In this example, each user may be represented by a distinct vertex in a graph, and a relationship between two users (e.g., a friendship relationship, a spousal relationship, a sibling relationship, etc.) can be represented by an edge between the two corresponding vertices in the graph.

In another example, an online payment provider may use a graph structure to represent user accounts with the payment provider. In this example, each user account may be represented by a distinct vertex in a graph, and each payment transaction conducted between two accounts may be represented by an edge connecting the two corresponding vertices. In some embodiments, the online payment provider may also use vertices to represent different assets or attributes in addition to, or other than, the user accounts. For example, the online payment provider may also use vertices to represent assets or attributes that may be shared by different user accounts, such as a network address (e.g., an Internet Protocol address, an email address, etc.), a device identifier, a physical location (e.g., a residential address, etc.), a funding source (e.g., a credit card account, a debit card account, etc.), and other data relevant to payment transactions. Vertices may then be connected based on different types of relationships. For example, when a user account uses a particular device to conduct a transaction, an edge may connect the vertex representing the user account and the vertex representing the particular device. When two user accounts have conducted payment transactions using the same device, the two vertices representing the two user accounts would be connected to the same vertex representing the device. As such, the relationships among different entities and/or assets can be represented in a much clearer manner using a graph structure than a conventional data structure (e.g., a relationship database, etc.).

A disadvantage of using a graph structure to store data is that a specialized graph query language (e.g., Gremlin, Cypher, etc.) is required for accessing the graph data within the graph structure (e.g., traversing a graph structure, obtaining values in a graph structure, creating new vertices or edges within a graph structure, etc.). These graph query languages have a more complicated format and are more difficult to learn and use than regular query languages, such as SQL, etc. Conventionally, data scientists, who have the knowledge and skills to analyze data to determine features for machine learning models, rely heavily on specialized software programmers to identify and evaluate different feature candidates for a machine learning model.

For example, based on a schema of the graph structure, a data scientist may identify possible feature candidates. A feature candidate may be associated with a graph traversal logic and a calculation. In a particular example, a data scientist may determine a feature candidate for a machine learning model configured to predict a risk of a new user account (e.g., an account that has just been registered). The feature candidate may be defined as an average transaction amount associated with an existing user account that shares the same network address with the new user account. Thus, in order to generate a value that corresponds to this feature candidate based on a seed account (e.g., the new user account), one would take a first hop in the graph structure from a vertex representing the seed account to another connected vertex representing a network address (e.g., a vertex that represents an IP address, etc.), and then take a second hop in the graph structure from the vertex representing the network address to another connected vertex representing an existing user account. Transaction data associated with the existing user account may be obtained and an average transaction amount may be calculated. In this example, the feature candidate requires a two-hop traversal from a seed vertex within the graph structure to reach a target vertex (e.g., the vertex representing the existing user account), and an average calculation based on attribute values associated with the target vertex.

The specialized software programmer may translate the graph traversal logic (based on communication from the data scientist) and the calculations to programming code in the graph query language (e.g., Gremlin, Cypher, etc.). By executing the programming code, the specialized software programmer may obtain sample values corresponding to the feature candidate. The data scientist may evaluate the quality of the feature candidate (e.g., how well the feature candidate correlates the task performed by the machine learning model) based on the sample values. This conventional process of feature engineering is time-consuming and error prone. For example, any disconnect between the data scientists and the software programmers (e.g., due to miscommunication, etc.) may cause delay or even errors in evaluating the feature candidates. Furthermore, the inability to directly access the graph structure further hinders the data scientists from identifying feature candidates that may be relevant for the machine learning model.

As such, according to various embodiments of the disclosure, a feature engineering system may assist a user in generating and evaluating features for a machine learning model, and incorporating the features into the machine learning model. In some embodiments, the feature engineering system may access graph data corresponding to a graph structure from a data storage. For example, the feature engineering system may use programming code corresponding to one of the graph query languages to access different portions of the graph data. Based on the different portions of the graph data, the feature engineering may generate a representation of at least a portion of the graph structure, and present the representation of the graph structure on a user interface. In some embodiments, the feature engineering system may enable the user to specify parameters for generating the representation of the graph. For example, via the user interface of the feature engineering system, the user may specify a seed account and a number of hops (connections) from the seed account. The feature engineering system may identify a vertex in the graph structure that corresponds to the seed account, and may traverse the specified number of hops from the vertex. The feature engineering system may obtain graph data based on the traversal, and generate a representation of that portion of the graph for display via the user interface.

In some embodiments, the feature engineering system may enable the user to define a feature candidate based on inputs provided via the user interface. The inputs may include interactions with the representation of the graph displayed on the user interface. For example, the user may define the number of hops (connections) from the seed vertex in order to reach one or more target vertices (e.g., by providing inputs on the representation of the graph), may define the type of edges to traverse (e.g., the type of relationships) and/or the type of vertex (e.g., a vertex representing a particular entity and/or asset) to traverse to, may identify attributes associated with the target vertices and/or the edges that connect the seed vertex to the target vertices usable to calculate a feature value corresponding to the feature candidate, and may define a calculation for the feature candidate based on the attributes (e.g., an average, a sum, a difference, a count, a maximum, a minimum, etc.). Using the example illustrated above, the user may define a feature candidate for predicting a risk of a new user account. The feature candidate may be associated with hopping from a seed vertex to a connected vertex representing a network address, and hopping from that vertex to another vertex representing a target account. The feature candidate may also be associated with obtaining transaction amounts of transactions conducted by the target account, and calculating an average of the transaction amounts.

Based on the inputs provided by the user via the user interface, the feature engineering system may implement the graph traversal logic using a graph query language. For example, the feature engineering system may generate programming code for performing the traversal of the graph from a given seed vertex representing a seed account, and calculating a feature value corresponding to the feature candidate for the seed account. In some embodiments, the feature engineering system may perform simulations on the feature candidate by repeatedly executing the programming code based on different seed accounts (e.g., different seed vertices) and obtain feature values corresponding to the feature candidate from the executions. Using the feature values, the feature engineering system may determine a degree of correlation between the feature candidate and the task performed by the machine learning model (e.g., how well the average transaction amount of the user account having a common network address correlate the risk prediction of another account). In some embodiments, the feature engineering system may generate a distribution of the feature values, and present the distribution on the user interface such that the user can determine a degree of correlation between the feature candidate and the task performed by the machine learning model.

When the degree of correlation between the feature candidate and the task performed by the machine learning model is high (e.g., above a threshold), or when a confirmation is received from the user via the user interface, the feature engineering system may incorporate the feature candidate into the machine learning model, as one of the input features of the machine learning model. For example, the feature engineering system may modify the structure of the machine learning model (e.g., adding an additional input node to an input layer of the machine learning model when the machine learning model is implemented as an artificial neural network, etc.). In some embodiments, the feature engineering system may also incorporate the programming code associated with the definition of the feature candidate into the machine learning model (and/or any software modules that use the machine learning model).

In some embodiments, the machine learning model may be configured to dynamically use input features defined by the feature engineering system. For example, instead of incorporating the programming code into the machine learning model (or the software module(s) that use the machine learning model), the feature engineering system may store the programming code as a template for the feature. Based on inputs received from the user via the user interface, the feature engineering system may generate and store different programming codes corresponding to definitions of different features for the machine learning model. The feature engineering system may include a configuration file for the machine learning model. The configuration file may specify which programming code stored within the feature engineering system to use for obtaining input values while performing the task (e.g., predicting a risk associated with a user account).

When a request to perform the task is received, the machine learning model may dynamically obtain input values corresponding to the features defined (or stored) by the feature engineering system. For example, the machine learning model may access the programming codes for obtaining the input values from the feature engineering system based on the configuration file, and may execute the programming codes based on a seed account. In another example, the feature engineering system may execute the programming codes based on the seed account to obtain the values corresponding to the features, and provide the values to the machine learning model as input values.

The ability to generate and manage features for different machine learning models by the feature engineering system enables the feature engineering system to dynamically modify the features of any one of the machine learning models without modifying the internal structure of the machine learning model. For example, based on inputs received from the user via the user interface, the feature engineering system may generate programming code for implementing a new feature defined by the user. The feature engineering system may add a new input feature and/or replace an existing input feature with a new feature by modifying the configuration file. After modifying the configuration file, the machine learning model (or the feature engineering system) may automatically determine input values corresponding to a set of features including the new input feature for the machine learning model when a request to perform the task is received. The machine learning model may use the input values to perform the task, without being aware of the change of the input features.

In some embodiments, the feature engineering system may also generate training data for training the machine learning model based on the input features defined for the machine learning model. For example, the feature engineering system may traverse the graph structure, and may obtain (or otherwise calculate) input values corresponding to the features defined for the machine learning model based on the data within the graph structure. The feature engineering system may then train the machine learning model using the obtained values.

By enabling the user (e.g., a data scientist of an organization or even a machine, such as an AI-based system) to define and evaluate feature candidates, and incorporate selected feature candidates into various machine learning models, the process of feature engineering becomes more efficient and less error prone. Furthermore, using templates for storing different programming codes corresponding to different features for the machine learning models, the input features of the machine learning models can be seamlessly and dynamically modified without accessing and adjusting the internal structures of the machine learning models.

FIG. 1 illustrates a networked system 100, within which the feature engineering system may be implemented according to one embodiment of the disclosure. Note that the present techniques may be applied in many different computing and technological environments, however, and are not limited to those shown in the figures. The networked system 100 includes a service provider server 130 and user devices 110, 170, and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may log in to a user account to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the service provider server 130 over the network 160. In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

In various implementations, the user 140 is able to input data and information into an input component (e.g., a keyboard or microphone) of the user device 110. For example, the user 140 may use the input component to interact with the UI application 112 (e.g., to retrieve content from third-party servers such as the service provider server 130, etc.).

Each of the user devices 170 and 180 may include similar hardware and software components as the user device 110 to enable their respective users to interact with the service provider server 130 through the user devices 170 and 180. For example, the users of the user devices 110, 170, and 180 may use the respective devices to conduct electronic transactions (e.g., login transactions, data access transactions, payment transactions, fund transfer transactions, etc.) through different user accounts of the service provider server 130.

The service provider server 130, in one embodiment, may be maintained by a transaction processing entity or an online service provider, which may provide processing for electronic transactions between different entities (e.g., among the users of the user devices 110, 170, and 180), between a user and one or more business entities, or other types of payees. As such, the service provider server 130 may include a service application 138, which may be adapted to interact with the user devices 110, 170, and 180 over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between users and/or between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, users of the user devices 170, 180, and 190, etc.) may access a user account associated with the user and access various services offered by the service provider server 130, by generating HTTP requests directed at the service provider server 130.

The service provider server 130, in one embodiment, may be configured to maintain one or more user accounts in an account database 136, each of which may be associated with a profile and may include account information associated with one or more individual users (e.g., the user 140 associated with user device 110, users associated with the user devices 170 and 180). The account information may include an identifier of the user account, and other information associated with the user such as a gender, an age, demographic information, device information associated with devices associated with the user (e.g., a device identifier, an Internet Protocol (IP) address of the device, a residential address, an operating system version, screen attributes of the device, etc.). In one implementation, a user may have credentials to authenticate or verify identity with the service provider server 130. Thus, the service provider server may store the credentials of the users in corresponding records of the account database 136 associated with the user accounts. In some embodiments, the account database 136 may also store transaction data associated with transactions that have been conducted by users of the service provider sever 130. The transaction data may include a transaction amount, device information associated with a device used by the user to conduct the transaction, merchant (or payee) information, item purchased, etc.

In some embodiments, the data associated with the various user accounts with the service provider server 130 and the transaction data associated with transactions conducted through the various user accounts may be stored in a graph data structure 142. In some embodiments, the graph data structure 142 may be part of the account database 136. The graph data structure 142 is different from a typical data structure (e.g., a relational database, etc.) in that it does not store data in a linear fashion (e.g., in rows and columns), but rather, stores data in terms of vertices (also referred to as "nodes") and edges. As such, the graph data structure 142 may include multiple vertices and edges that connect the vertices. Each of the vertices and edges may be implemented as a distinct data structure (e.g., an object within a programming code, etc.), which may store data associated with the respective vertices and edges.

As discussed herein, graph data structures have advantages over conventional data structures (e.g., a relationship database) in representing relationships among different objects. Various objects can be represented by corresponding vertices, and relationships among the objects can be represented by edges that connect the corresponding vertices. In this example, vertices in the graph data structure 142 may be used to represent various entities, attributes, data and/or assets related to the service provider server 130, and edges within the graph data structure 142 may be used to represent the relationships among the different entities, attributes, data and/or assets related to the service provider server 130. For example, the service provider server 130 may use a vertex to represent each user account with the service provider server 130. Thus, each user account may have a corresponding vertex in the graph data structure 142. The vertex representing a user account may store account data associated with the corresponding user account. For example, each vertex that represents a user account may include an account identifier and attributes of a person/entity associated with the user account, such as a name, a gender, a physical address, an email address, and other information associated with the person/entity. In some embodiments, the service provider server 130 may use an edge to represent a transaction that is conducted between two user accounts. Thus, an edge may be generated to connect two vertices within the graph data structure 142 when a transaction has been conducted between two user accounts represented by the two vertices.

In some embodiments, the service provider server 130 may use vertices to represent other assets or attributes related to the service provider server 130. For example, the service provider server 130 may also use vertices to represent assets or attributes that may be shared by different user accounts, such as a network address (e.g., an Internet Protocol address, an email address, etc.), a device identifier, a physical location, a funding source (e.g., a credit card account, a debit card account, etc.), and other data relevant to payment transactions. When vertices are used to represent different types of entities and/or assets, the vertices may then be connected via edges based on different types of relationships as well. For example, as illustrated above, an edge may represent a transactional relationship when the edge connects two vertices representing two user accounts have conducted one or more transactions with each other.

In another example, when a user account uses a particular device to conduct a transaction, an edge may connect the vertex representing the user account and the vertex representing the particular device (or a particular device identifier) within the graph data structure 142 based on a usage relationship. When two user accounts have conducted payment transactions using the same device, the two vertices representing the two user accounts would be connected to the same vertex representing the device within the graph data structure 142.

Similarly, when a particular funding instrument (e.g., a particular credit card, etc.) has been used to conduct a transaction through a user account, an edge may connect a vertex representing the user account and a vertex representing the particular funding instrument in the graphical data structure 142 based on a usage relationship. When two user accounts have conducted payment transactions using the same financial instrument, the two vertices representing the two user accounts would be connected to the same vertex representing the financial instrument within the graph data structure 142.

In various embodiments, the service provider server 130 also includes a feature engineering module 132 that implements the feature engineering system as discussed herein. In particular, the feature engineering module 132 may assist a user in identifying and evaluating various feature candidates for use in one or more machine learning models. For example, the feature engineering module 132 may access graph data within the graph data structure 142. Based on the graph data, the feature engineering module 132 may generate a representation (e.g., a graphical representation) of at least a portion of the graph data structure 142, and may present the representation via a user interface of a device (e.g., a device 190, which can be a personal computer, a mobile device, or a computer server). The feature engineering module 132 may enable a user to define a feature candidate based on inputs provided via the user interface. The inputs may include user interactions with the representation of the graph data structure 142 displayed on the user interface. Based on the inputs, the feature engineering module 132 may generate a definition for a feature candidate for use in one or more machine learning models.

Figure 2:
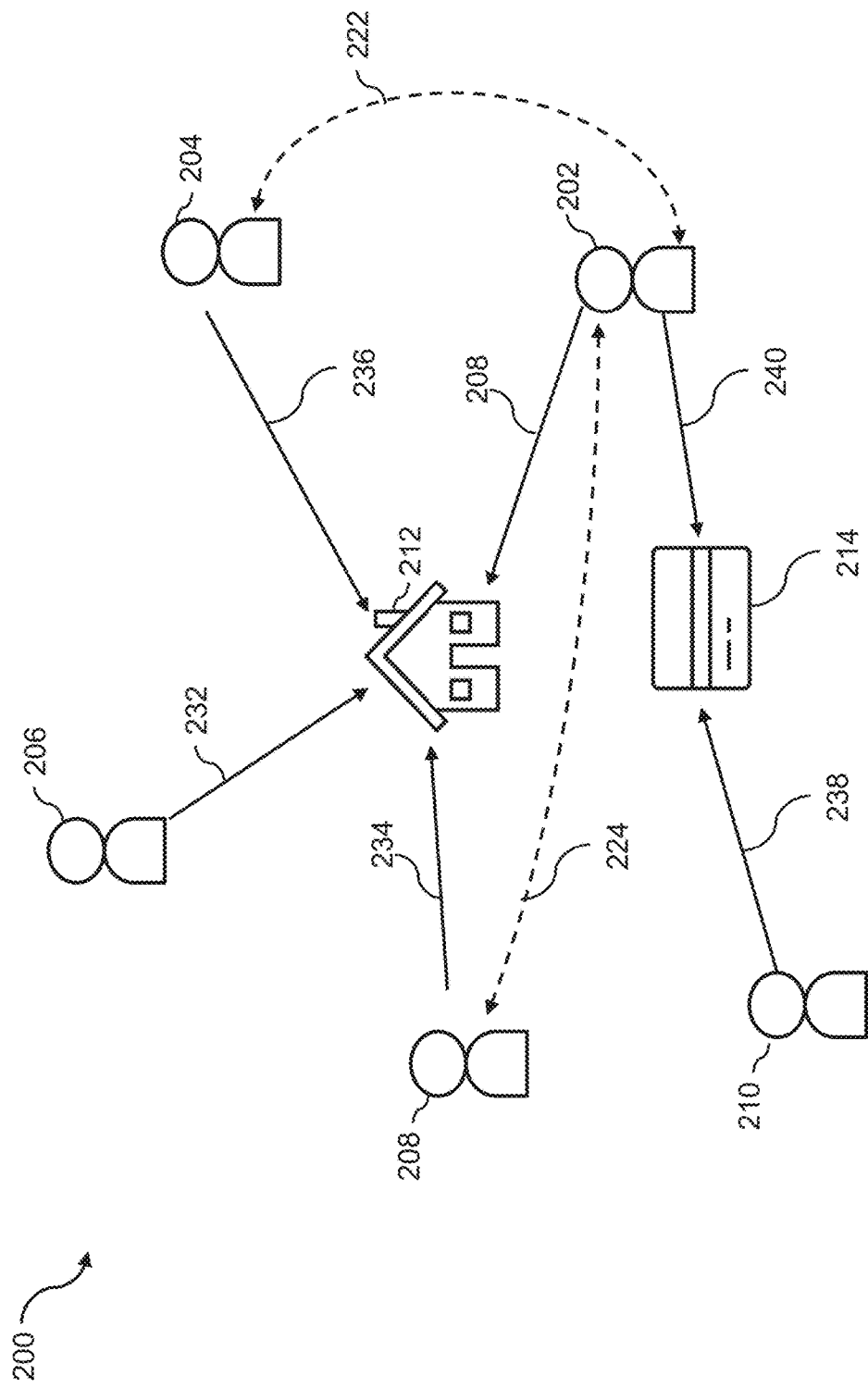
FIG. 2 illustrates an example graph according to an embodiment of the present disclosure.

FIG. 2 illustrates an example graph 200 based on the graph data structure 142 according to various embodiments of the disclosure. In some embodiments, the graph 200 may represent a portion or the entirety of the graph data structure 142. As shown, the graph 200 includes multiple vertices 202, 204, 206, 208, 210, 212, and 214 representing various entities, attributes, data and/or assets. For example, the vertices 202, 204, 206, 208, and 210 represent various user accounts with the service provider server 130 (e.g., a user account associated with the user 140, user accounts associated with users of the user devices 170 and 180, etc.). The vertex 212 represents a physical address and the vertex 214 represents a funding instrument (e.g., a credit card, a debit card, a gift card, a bank account, etc.).

The graph 200 also includes multiple edges 222, 224, 232, 234, 236, 238, and 240 that connect the vertices in the graph 200. Different edges in the graph 200 may represent different types of relationships. For example, the edges 222 and 224 represent transactional relationships between user accounts. Specifically, the edge 222 represents one or more transactions conducted between user accounts represented by the vertices 202 and 204, and the edge 224 represents one or more transactions conducted between user accounts represented by the vertices 202 and 208. The edges 232, 234, and 236 may represent a residential relationship between user accounts and a residential address represented by the vertex 212. Specifically, the edge 232 indicates that a user of a user account represented by the vertex 206 resides at the address represented by the vertex 212. Similarly, the edge 234 indicates that a user of a user account represented by the vertex 208 resides at the address represented by the vertex 212, and the edge 236 indicates that a user of a user account represented by the vertex 204 resides at the address represented by the vertex 212. By analyzing the graph 200, it can be determined that the user accounts represented by the vertices 204, 206, and 208 are related to each other, as the users of the user accounts reside at the same address.

The edges 238 and 240 represent a usage relationship between user accounts and a funding instrument represented by the vertex 214. Specifically, the edge 238 indicates that a user of a user account represented by the vertex 210 has conducted a transaction using the financial instrument represented by the vertex 214. Similarly, the edge 240 indicates that a user of a user account represented by the vertex 202 has conducted a transaction using the same financial instrument represented by the vertex 214. By analyzing the graph 200, it can be determined that the user accounts represented by the vertices 202 and 210 are related to each other, as the users of the user accounts have conducted transactions using the same financial instrument.

In some embodiments, the representation of the graph data structure 142 generated by the feature engineering module 132 may appear similar to the graph 200 in FIG. 2. Based on viewing and analyzing the graph 200, a user (e.g., a user of the device 190) may determine various relationships among different entities and/or assets that are related to the service provider server 130, and may identify feature candidates that can be used by one or more machine learning model for performing a task for the service provider server 130.

The service provider server 130 may use one or more machine learning models for performing different tasks related to the operations of the service provider server 130. For example, since the service provider server 130 is configured to manage user accounts of users and process electronic payment transactions (among other electronic services) through the user accounts, the service provider server 130 may generate and/or configure a machine learning model to predict a risk associated with a payment transaction. The predicted risk may be used by the service application 138 in processing payment transactions (e.g., authorizing the payment transaction when the risk is below a threshold and denying the payment transaction when the risk is above the threshold, etc.). In another example, the service provider server 130 may generate and/or configure another machine learning model to predict a risk associated with a user account. The predicted risk may be used by the service application 138 to modify access level of different user accounts (e.g., restricting certain functionalities, such as payment transactions above a certain amount or certain data access, for a user account when the risk is above a threshold).

In order to configure a machine learning model to perform a task, a set of input features are determined to be relevant to performing the task. The set of input features may be associated with attributes that are stored by the service provider server 130 (e.g., stored in the accounts database 136, the graph data structure 142, etc.) or attributes that can be calculated based on other attributes stored by the service provider server 130. For example, an input feature for the machine learning model configured to predict a risk of electronic payment transactions may be an average transaction amount associated with a user account. Since the service provider server 130 stores transaction data of user accounts (e.g., in the account database 136 and/or the graph data structures 142 in association with edges that represent transactional relationships among user accounts, etc.), values corresponding to that input feature can be calculated based on the stored transaction data (e.g., calculating an average of transaction amounts of transactions conducted through a user account, etc.).

The machine learning model is then trained using training data that corresponds to the set of input features. By learning patterns based on the training data, the trained machine learning model may then perform the task (e.g., predicting a risk of a user account, predicting a risk of an electronic payment transaction, etc.) using the learned patterns. As such, the selection of quality input features, also referred to as "feature engineering," is crucial to the performance of the machine learning model in performing the task (e.g., how accurate can the machine learning model predict a risk). Furthermore, as trends come and go, the types of features that are relevant to performing a task may change over time. As such, it is important to frequently re-evaluate the input features of a machine learning model, and identify any new features that may be relevant to the task such that the machine learning model can keep pace with the changes. Determining which input features to re-evaluate and when to do so can be based on various factors, including, but not limited to, when a new input feature is identified, when accuracy of predictions drop below a certain threshold, or when a new type of prediction is desired.

In some embodiments, the feature engineering module 132 may assist a user (e.g., the user of the device 190) in the feature engineering process by enabling the user to identify feature candidates, evaluate feature candidates, and incorporate feature candidates into one or more machine learning models via a user interface provided on a device, without requiring the user to input any programming code. For example, the feature engineering module 132 may access graph data associated with the graph data structure 142 by using a graph query language. The graph data may include information associated with vertices and edges within the graph data structure 132. Based on the graph data, the feature engineering module 132 may construct a graphical representation of at least a portion of the graph data structure 142. The feature engineering module 132 may present the graphical representation on a user interface of a device (e.g., the device 190). In some embodiments, the graphical representation may look like the graph 200 of FIG. 2, which includes icons representing the vertices and lines representing the edges of the graph data structure 142.

In some embodiments, the feature engineering module 132 may construct the graphical representation of a portion of the graph data structure 142 based on one or more parameters provided by the user. For example, the user may provide, via the user interface on the device 190, an identifier of a seed account (e.g., a user account with the service provider server 130) and a number of hops from the seed account. Based on the one or more parameters, the feature engineering module 132 may first access the graph data associated with a vertex (e.g., a seed vertex) representing the seed account. The feature engineering module 132 may then traverse the graph data structure 142 from the seed vertex and obtain graph data associated with the edges and other vertices from the traversal of the graph data structure 142. In some embodiments, the feature engineering module 132 may limit the traversal of the graph data structure 142 by the number of hops specified in the one or more parameters. In one particular example, the graph 200 of FIG. 2 may be constructed by the feature engineering module 132 based on a seed account represented by the vertex 202 and a two-hop traversal. Thus, the graph 200 includes the vertex 202 representing the seed account, and edges and other vertices that are within two-hops from the vertex 202 (e.g., the vertices 212 and 214 within one-hop from the seed vertex 202, and the vertices 204, 206, 208, and 210 within two-hop from the seed vertex 202).

By viewing and analyzing the graphical representation of the graph data structure 142, a user of the device 190 may identify attributes that are obtainable from the graph data structure 142 and possibly relevant to performing a task associated with a machine learning model. For example, the user may determine that a residential address of the seed account would be a feature candidate for predicting a risk of the seed account. The user may also determine that an average transaction amount associated with other user accounts that shares a financial instrument with the seed account would be a feature candidate for predicting a risk of the seed account.

Conventionally, the user may have to communicate the logic associated with the feature candidates to a specialized software programmer who is proficient in a graph query language (e.g., Gremlin, Cypher, etc.), such that the feature candidates can be implemented with respect to the graph data structure 142 for testing and evaluation, and ultimately incorporation into one or more machine learning models. However, as discussed herein, the conventional process of feature engineering, based on the back-and-forth communication between data scientists and software programmers can be inefficient and error prone. As such, the feature engineering module 132 may enable the user to define the logic for feature candidates via the user interface, and automatically implement the logic for the feature candidates with respect to a graph data structure (e.g., the graph data structure 142).

Figure 3:
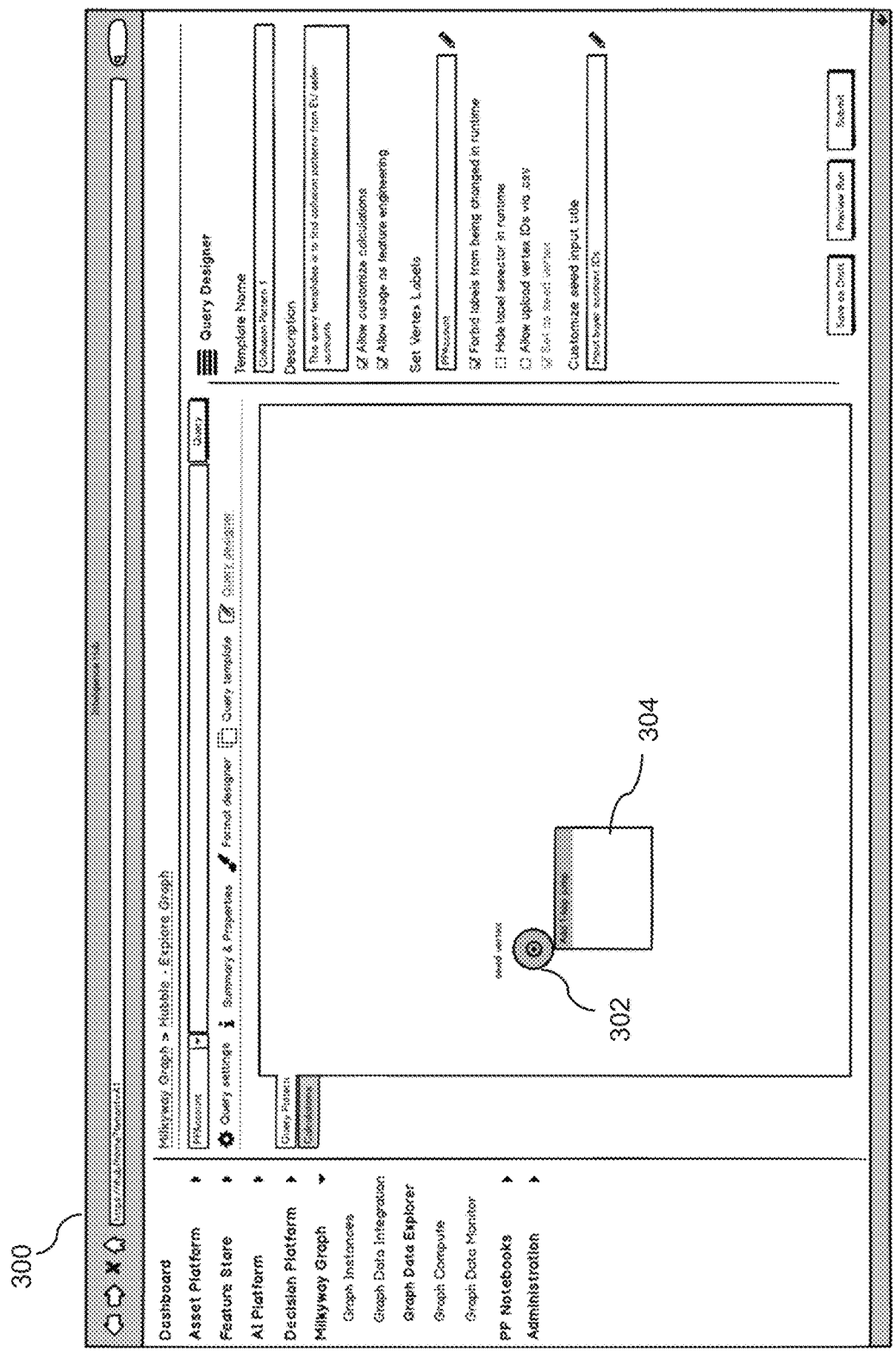
FIGS. 3-5 illustrate exemplary user interfaces provided by a feature engineering system for identifying and evaluating feature candidates according to an embodiment of the present disclosure.

In some embodiments, the user may provide an input indicating how to traverse from a seed vertex to obtain data for a feature candidate. For example, the user may indicate a number of hops to traverse from the seed vertex and the type(s) of edges for traversing from the seed vertex. FIG. 3 illustrates an example user interface 300 provided by the feature engineering module 132 that enables a user to define a feature candidate for one or more machine learning models according to various embodiments of the disclosure. The user interface 300 may be provided on a user device (e.g., the device 190, etc.) associated with the service provider server 130 (e.g., a device operated by an agent of a service provider associated with the service provider server 130). During the feature engineering process in which the user defines a feature candidate, the feature engineering module 132 may present an icon (e.g., an icon 302) representing an arbitrary seed vertex. The icon may not correspond to any particular vertex in the graph data structure 142, but is used as a tool for defining attributes associated with a feature candidate.

Via the user interface 300, the user of the device 190 may indicate a number of hops to traverse from the seed vertex. For example, the user may select the icon 302 displayed on the user interface 300. Upon receiving a selection of the icon 302, the feature engineering module 132 may enable the user to specify the number of hops to traverse from the seed vertex. In one example, the feature engineering module 132 may display a drop-down menu 304 that provides different options associated with different numbers of hops. The user may then select one of the options from the drop-down menu 304 to specify the number of hops to traverse from the seed vertex. In a particular example, when the user wants to define a feature candidate that is associated with an average transaction amount of an account that shares the same residential address with a seed account, the user may specify a two-hop traversal from the seed vertex for the feature candidate—a first hop traversal from the seed vertex to a vertex that represents a residential address associated with the seed account, and a second hop traversal from the vertex that represents the residential address to one or more vertices representing other accounts that share the same residential address associated with the seed account.

Figure 4:
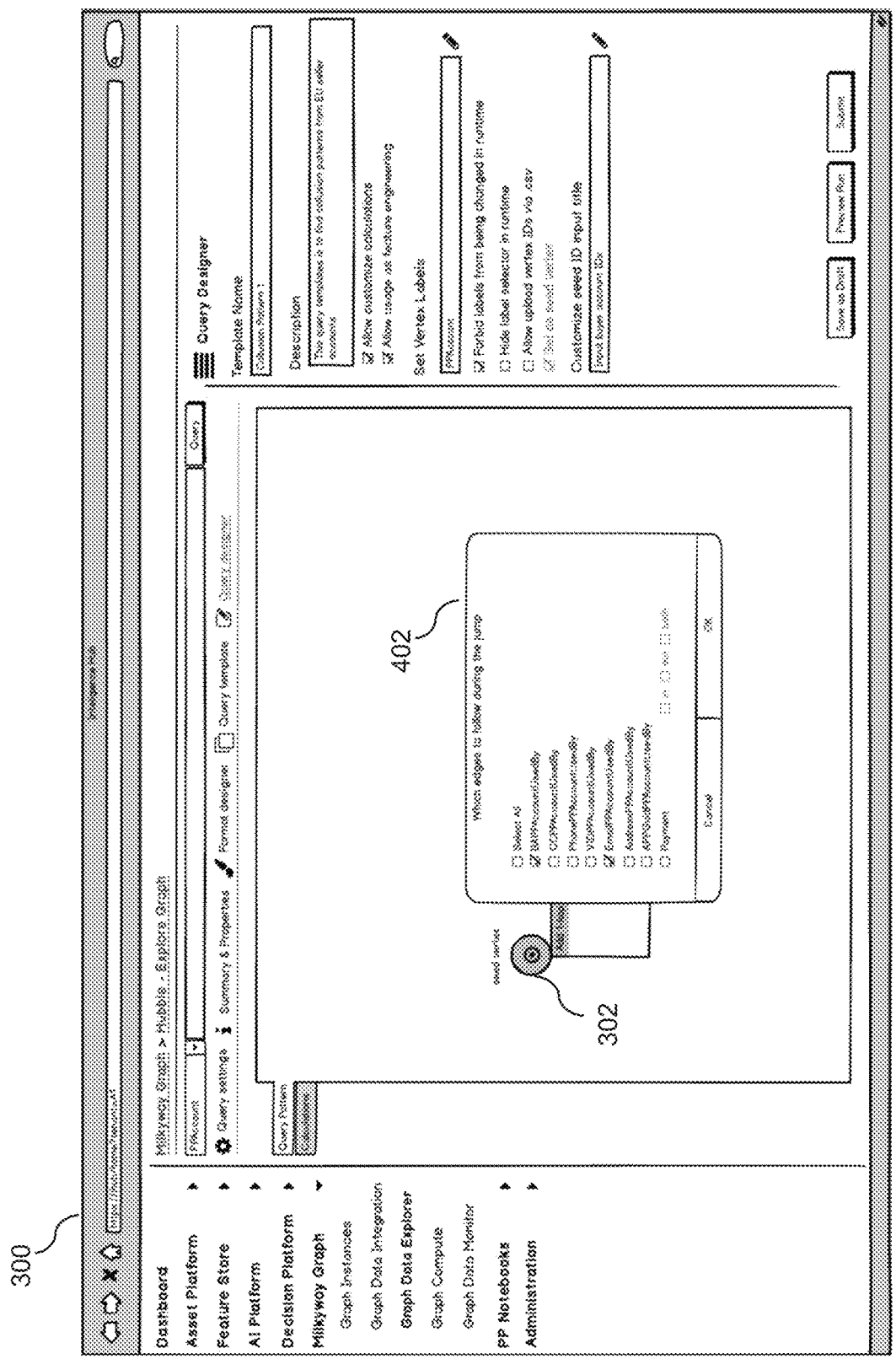

FIG. 4 illustrates the user interface 300 after the user has specified the number of hops to traverse from the seed vertex according to various embodiments of the disclosure. In some embodiments, after receiving a user input indicating a number of hops to traverse from the seed vertex, the feature engineering module 132 may enable the user to specify the type(s) of edges (e.g., the type(s) of relationships) via which the graph data structure 142 can be traversed from the seed vertex. For example, the feature engineering module 132 may analyze the edges that exist in the graph data structure 142 and may determine the different types of edges (e.g., the different types of relationships) associated with the edges. The types of edges (e.g., relationships) included in the graph data structure 142 may include a "payment transaction" relationship that represents one or more payment transactions conducted between two accounts, a "funding instrument usage" relationship that represents one or more payment transactions that have been conducted through a user account using a particular funding instrument, a "residential" relationship that represents a location at which a user associated with a user account resides, and other types of relationships.

The feature engineering module 132 may then present the different types of relationships as options via the user interface 300. In this example, the feature engineering module 132 may present a window 402 that includes different checkboxes associated with the different relationships found in the graph data structure 142. The user may select the type(s) of edges to traverse from the seed vertex 302 by selecting one or more of the checkboxes within the window 402. Using the example described above, the user may select the "residential" relationship for the first hop traversal. However, while not shown in this example, other options associated with edge characteristics may also be presented and selectable by the user, such as a timing (e.g., a range of time) when the edge was created, a minimum (or maximum) number of connections between two vertices (e.g., indicating a minimum (or maximum) number of transactions made between the two vertices), or other edge characteristics.

Figure 5:
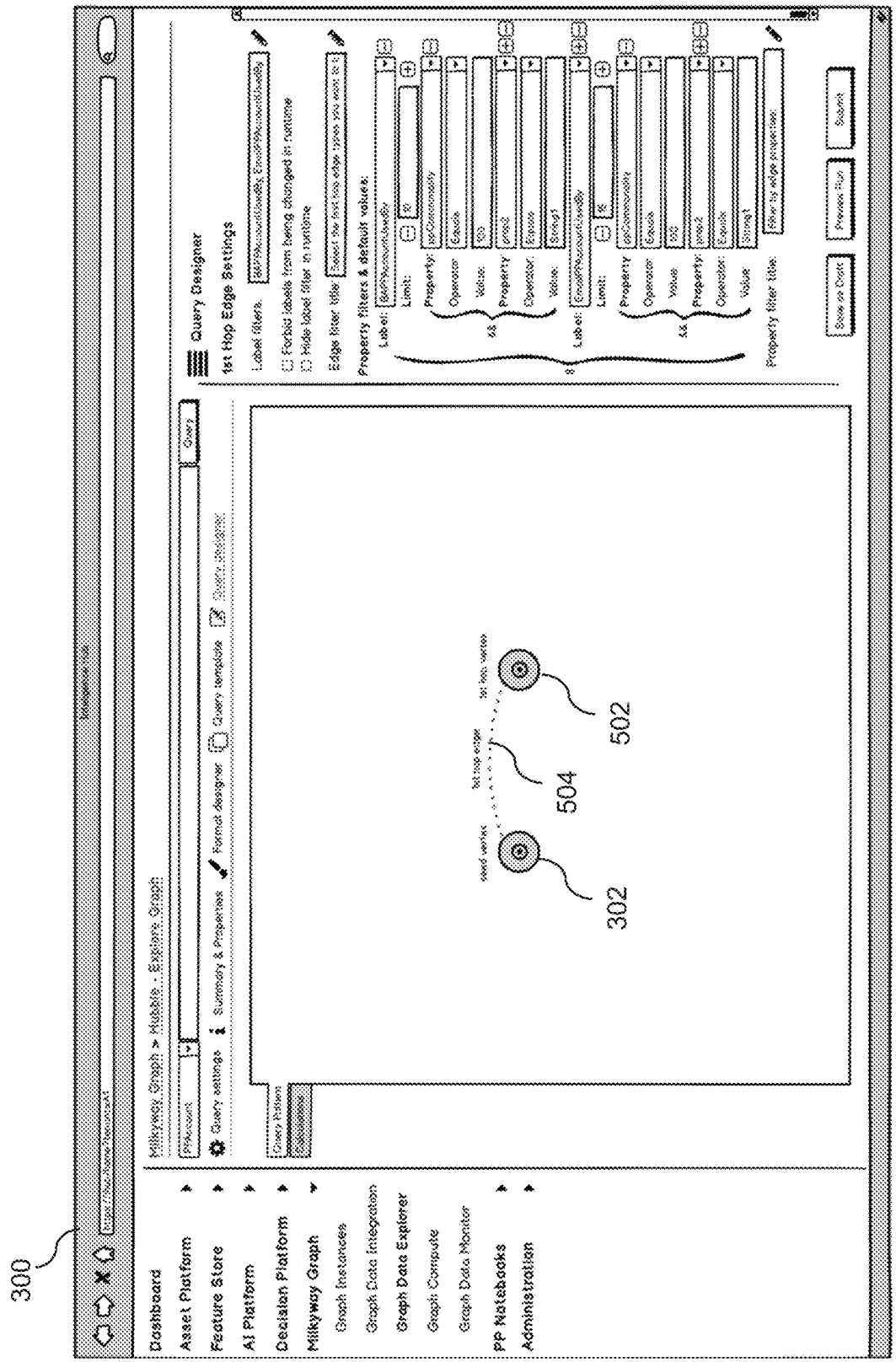

FIG. 5 illustrates the user interface 300 after the user has specified the types of edges to traverse from the seed vertex according to various embodiments of the disclosure. As shown, the feature engineering module 132 has presented, in addition to the icon 302 representing the seed vertex, an icon 502 representing one or more first-hop vertices and a dotted line 504 connecting the icons 302 and 502. The dotted line 504 represents one or more first-hop edges for use to traverse from the seed vertex to the one or more first-hop vertices. Since the icon 302 represents an arbitrary seed vertex (which can be any vertex within the graph data structure 142), it is undetermined at this time during the feature engineering process how many vertices can be reached based on a one-hop traversal from a seed vertex. Thus, the icon 502 represents arbitrary vertices that can be reached from the arbitrary seed vertex based on a one-hop traversal using the type(s) of edges represented by the dotted line 504 and indicated by the user.

If the user has specified only a one-hop traversal for the feature candidate, the feature engineering process may end here. However, if the user has specified additional hops (e.g., two hops, three hops, etc.) of traversal for the feature candidate, the user may continue to specify the type(s) of edges to traverse for the subsequent hop(s) (e.g., the second hop, the third hop, etc.) in the same manner as disclosed herein. Using the example described above, the user may select the "residential" relationship for the second hop edge from the seed vertex, such that vertices representing user accounts that share the same residential address as the seed account can be reached based on the traversal from the seed vertex.

After defining the traversal logic for the feature candidate, the feature engineering module 132 may enable, via the user interface 300, the user to define the types of attributes associated with the target vertices to obtain and a mathematical operation (e.g., addition, subtraction, an average, etc.) for calculating a value corresponding to the feature candidate. Using the example described above, the user may specify to obtain data corresponding to the transaction amount attribute that is associated with each of the target vertices. The data may indicate the transaction amounts associated with transactions conducted through user accounts represented by the target vertices in the past. The user may also specify an 'average' operation to calculate a value corresponding to the feature candidate based on the data.

Figure 6:
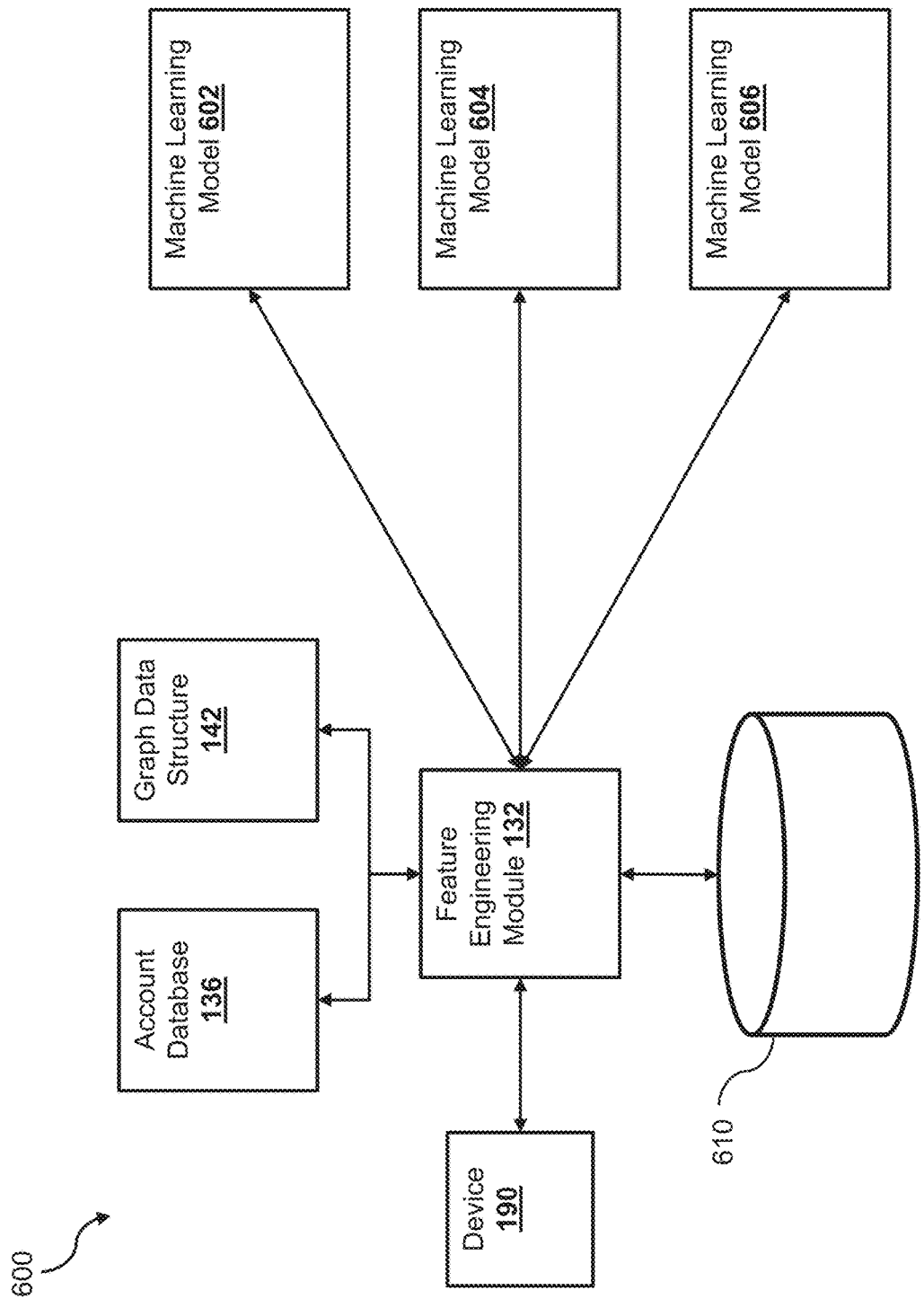
FIG. 6 is a block diagram illustrating a feature engineering module according to an embodiment of the present disclosure.

In some embodiments, based on the feature candidate defined by the user via the user interface 300, the feature engineering module 132 may implement the feature candidate, evaluate the feature candidate, and incorporate the feature candidate into one or more machine learning models as one of the input features of the one or more machine learning models. FIG. 6 illustrates a computing environment 600 within which the feature engineering module 132 may implement, evaluate, and incorporate the feature candidates in one or more machine learning models. In some embodiments, based on the user inputs received from the user of the device 190, the feature engineering module 132 may generate programming code that implements the logic associated with the feature candidate in a graph query language (e.g., Gremlin, Cypher, etc.). The programming code, when executed based on a specified seed vertex (e.g., when provided an identifier of a vertex as an input value, etc.), may cause a machine to traverse a graph data structure (e.g., the graph data structure 142) from the specified seed vertex using the traversal logic specified by the user, obtain data associated with the target vertices and/or the edges, and calculate a value corresponding to the feature candidate based on the data. For example, when the feature candidate is associated with an average transaction amount of transactions conducted through user account(s) that share the same residential address with the seed account, the programming code may cause the machine to hop (e.g., a first hop) from the seed vertex to a neighboring vertex representing a residential address, then hop (e.g., a second hop) from the vertex representing the residential address to one or more other vertices (e.g., target vertices) representing other accounts associated with the residential address. The programming code may further cause the machine to obtain data from the vertices and/or edges along the path of the traversal. For example, the programming code may cause the machine to obtain transaction amounts of transactions conducted through user accounts represented by the target vertices. The programming code may then cause the machine to calculate a value corresponding to the feature candidate based on the data (e.g., calculating an average based on the transaction amounts).

The feature engineering module 132 may store the programming code in association with the feature candidate in a data storage 610, such that the programming code may be retrieve and executed when needed. In some embodiments, the feature engineering module 132 may perform simulations for the feature candidate based on different seed accounts (e.g., different seed vertices). As such, the feature engineering module 132 may execute the programming code associated with the feature candidate based on different seed vertices within the graph data structure 142. By executing the programming code based on the different seed vertices in the graph data structure 142, different values (e.g., average transaction amount) corresponding to the feature candidate may be calculated for the different seed accounts. In some embodiments, the feature engineering module 132 may present the result of the simulations on a user interface (e.g., the user interface 300). In some embodiments, the feature engineering module 132 may evaluate the feature candidate based on the simulation results (e.g., the values corresponding to the feature candidate determined based on different seed accounts) and the task performed by a machine learning model. For example, when the feature candidate is generated for a machine learning model 602 configured to predict a risk of a user account, the feature engineering module 132 may determine whether a correlation exists between the values corresponding to the feature candidate generated from the simulations and a risk score previously determined for the respective seed accounts used in the simulations. In some embodiments, when the feature engineering module 132 determines that a correlation exists between the values corresponding to the feature candidate and the risk scores (or based on a confirmation from a user of the device 190), the feature engineering module 132 may incorporate the feature candidate into the machine learning model 602 as one of the input features for the machine learning model 602, using techniques described herein. In some embodiments, the feature engineering module 132 may analyze the simulation result based on a specification provided by a user via a user interface. For example, the user may specify a set of requirements and/or definitions for a correlation between the values corresponding to the feature candidate and the risk scores.

In some embodiments, the feature engineering module 132 may add an input feature to the machine learning model 602 by modifying the internal structure of the machine learning model 602. For example, if the machine learning model 602 is implemented as an artificial neural network, the feature engineering module 132 may modify the input layer of the artificial neural network (e.g., adding an additional input node in the input layer, etc.).

In some embodiments, the feature engineering module 132 may also incorporate the programming code into the machine learning model 602, such that when the machine learning model 602 is used by another software module (e.g., a risk assessment module for the service provider server 130, etc.), the machine learning model 602 may use the programming code to retrieve an input value corresponding to the feature candidate to perform the task.

In some embodiments, the feature engineering module 132 may also generate new training data for training the machine learning model 602 based on data retrieved from the graph data structure 142 and/or the account database 136. The new training data may include values that correspond to the feature candidate, such that the modified machine learning model 602 may be trained to learn patterns based on the feature candidate (e.g., the new input feature) along with the existing input features. The feature engineering module 132 may then train the machine learning model 602 using the new training data.

In some embodiments, instead of incorporating the programming code within the machine learning model 602 and/or other software modules, the feature engineering module 132 may retain the programming code under its control. For example, the feature engineering module 132 may establish a protocol with the machine learning model 602 such that whenever the machine learning model 602 is requested to perform the task (e.g., provide a risk prediction of a user account, etc.), the machine learning model 602 would request (e.g., via an application programming interface (API) call, etc.) the feature engineering module 132 to obtain the value corresponding to the feature for use as an input value for the machine learning model 602.

The ability of the feature engineering module 132 to store and manage the programming code associated with various input features for the machine learning model 602 enables flexibility regarding the implementation of the various input features for the machine learning model 602. For example, the feature engineering module 132 may modify the implementation of the various input features of the machine learning model 602 without modifying the machine learning model 602. In some embodiments, the feature engineering module 132 may (e.g., automatically or upon a request from the user of the device 190) re-evaluate the existing input features of the machine learning model 602, and may also identify and evaluate new feature candidates for the machine learning model 602 (e.g., periodically, etc.). Based on the effectiveness of input features and the feature candidates (e.g., correlations between the input features and the task, etc.), the feature engineering module 132 may change the input features of the machine learning model 602 to improve the performance of the machine learning model 602 based on the evaluation. The change may include replacing an existing input feature with a new feature, adjusting a parameter of an existing input feature (e.g., adjusting different weights that may be applied to different values to calculate the input feature, etc.), adjusting an implementation of an existing input feature (e.g., adding or removing the number of hops to traverse from a seed vertex, etc.), and the like. The feature engineering module 132 may change the input features by modifying and/or replacing the programming code associated with the input features and stored in the data storage 610 associated with the feature engineering module 132 without requiring any changes to the machine learning model 602.

In some embodiments, the feature engineering module 132 may manage existing input features and assist the user of the device 190 to create new features for other machine learning models (e.g., machine learning models 604 and 606) using the same techniques as disclosed herein. The machine learning models 604 and 606 may be configured to perform different tasks than the one performed by the machine learning model 620. For example, the machine learning model 604 may be configured to predict a risk associated with an electronic transaction, while the machine learning model 606 may be configured to predict a product recommendation for a user. As such, the feature engineering module 132 may determine feature candidates for each of the machine learning models 602, 604, 606 based on user inputs via the user interface 300. The feature engineering module 132 may generate programming code for each of the feature candidates, and may evaluate the feature candidates by performing simulations on the graph data structure 142. The feature engineering module 132 may also incorporate one or more of the feature candidates into the machine learning models 602, 604, and 606 (either by changing the internal structures of the machine learning models 602, 604, and 606 or changing the configuration files for the machine learning models 602, 604, and 606).

By assisting the user of the device 190 (e.g., who may be a data scientist of the service provider associated with the service provider server 130) to define and evaluate feature candidates, and incorporate selected feature candidates into various machine learning models, the process of feature engineering becomes more efficient and less error prone. For example, the user (e.g., the data scientist) may perform the entire feature engineering process without requiring the involvement of other personnel (e.g., specialized software programmers). Furthermore, by managing the features of the various machine learning models outside of the machine learning models (e.g., within the feature engineering module 132, etc.), the input features of the machine learning models can be seamlessly and dynamically modified without accessing and/or adjusting the internal structures of the machine learning models. Since input features of a machine learning model may be changed frequently in order to maintain and/or improve the performance of the machine learning model, the feature engineering module 132 may continuously re-evaluate existing input features and evaluate new feature candidates for a machine learning model, and implement changes to the input features for the machine learning model without accessing and/or adjusting the internal structures of the machine learning model.

Figure 7:
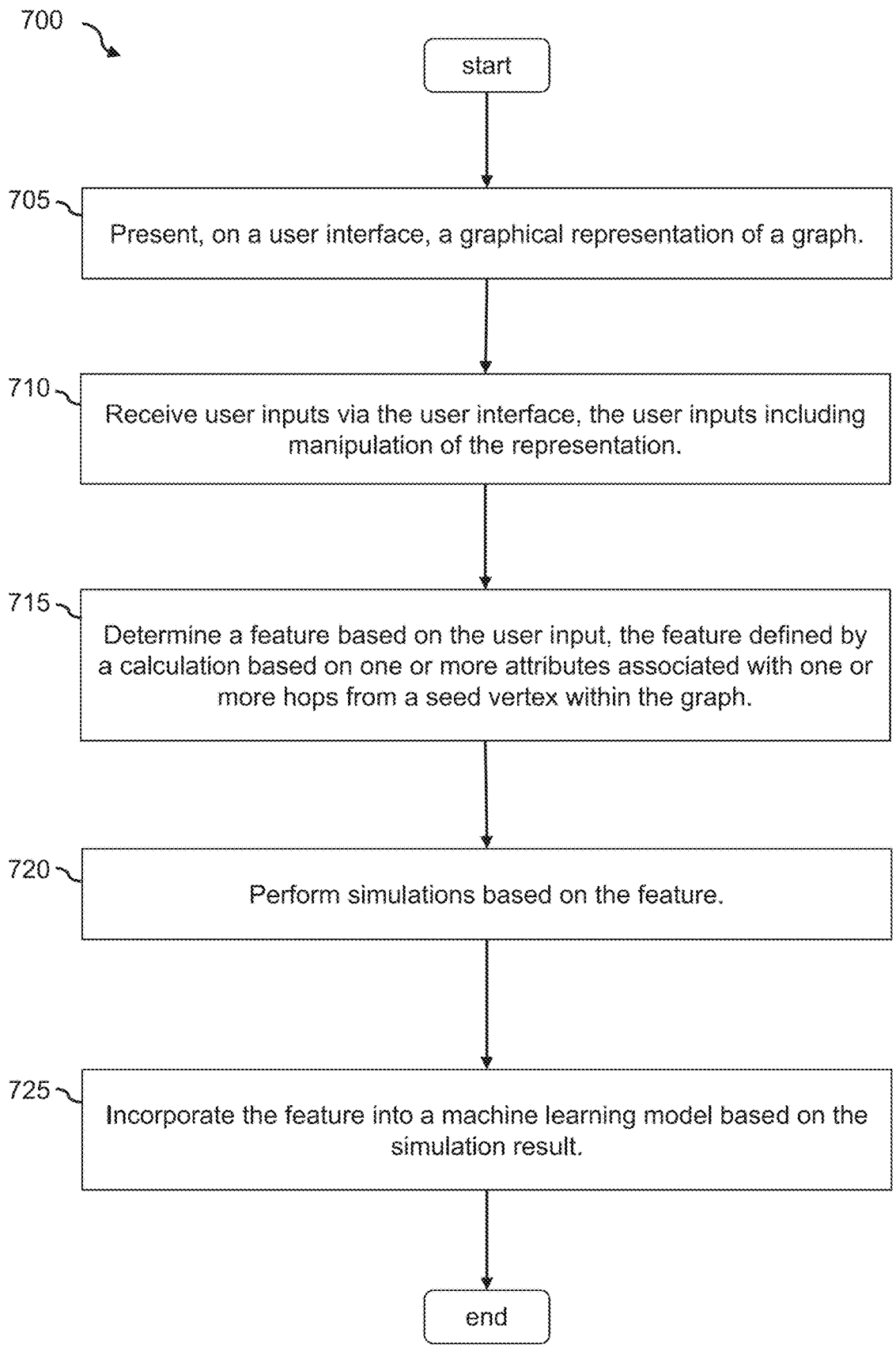
FIG. 7 illustrates a flowchart showing a process of identifying and evaluating feature candidates according to an embodiment of the present disclosure.

FIG. 7 illustrates a process 700 for providing a tool to assist a user in defining, evaluating and incorporating features into a machine learning model according to various embodiments of the disclosure. In some embodiments, at least a portion of the process 700 may be performed by the feature engineering module 132. The process 700 may begin by presenting (at step 705), on a user interface, a graphical representation of a graph. For example, the feature engineering module 132 may access graph data associated with the graph data structure 142, and may generate a representation of at least a portion of the graph data structure 142. The feature engineering module 132 may then present the representation on the user interface 300 of the device 190. The representation may include vertices and edges of the graph data structure 142.

The process 700 then receives (at step 710) user inputs via the user interface, the user inputs including manipulation of the representation. For example, the user of the device 190 may provide user inputs via the user interface 300. The user inputs may include manipulation of the representation of the graph data structure 142 (e.g., selecting one or more vertices in the representation). Based on the manipulation of the representation, different graph data associated with the different vertices and/or edges within the graphical data structure 142 may be presented via the user interface 300. The user may also perform an action, via the user interface 300, to indicate a desire to define a new feature candidate. In some embodiments, upon detecting the action via the user interface 300, the feature manipulation module 132 may present, on the user interface 300, an icon representing an arbitrary seed vertex of the graphical data structure 142. The user may continue to provide input based on the icon, to specify logic associated with the feature candidate. The logic may include a traversal logic, such as a number of hops to traverse from the seed vertex during a traversal, and the type(s) of edges to traverse during the traversal.

The process 700 determines (at step 715) a feature based on the user input, the feature defined by a calculation based on one or more attributes associated with one or more hops from a seed vertex within the graph. For example, the feature engineering module 132 may implement the logic of the feature candidate using a graph query language (e.g., generating programming code in the graph query language, etc.). The feature engineering module 132 may store the programming code in the data storage 610.

The process 700 then performs (at step 720) simulations based on the feature and incorporates (at step 725) the feature into a machine learning model based on the simulation result. Using the programming code generated for the feature candidate, the feature engineering module 132 may traverse the graph data structure 142 and calculate a value corresponding to the feature candidate based on a given seed vertex. As such, the feature engineering module 132 may perform multiple simulations by executing the programming code based on different vertices (as seed vertices) in the graph data structure 142. By executing the programming code, a value corresponding to the feature candidate may be calculated for a corresponding seed vertex. The feature engineering module 132 may also determine labels corresponding to the machine learning model based on the seed vertices (e.g., a determined risk score for the user accounts represented by the seed vertices, etc.). The feature engineering module 132 may then determine whether a correlation exists between the calculated values corresponding to the feature candidate and the labels. If a correlation exists (or requested by a user), the feature engineering module 132 may incorporate the feature candidate into the machine learning model 602 as an input feature for the machine learning model 602.

FIG. 8 is a block diagram of a computer system 800 suitable for implementing one or more embodiments of the present disclosure, including the service provider server 130, the user devices 110, 170, 180, and the device 190. In various implementations, each of the devices 110, 170, 180, and 190 may include a mobile cellular phone, personal computer (PC), laptop, wearable computing device, etc. adapted for wireless communication, and the service provider server 130 may include a network computing device, such as a server. Thus, it should be appreciated that the devices/servers 110, 130, 170, 180, and 190 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account or a checkout page for purchasing an item from a merchant. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via a network 822, such as network 160 of FIG. 1. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid-state drive, a hard drive). The computer system 800 performs specific operations by the processor 814 and other components by executing one or more sequences of instructions contained in the system memory component 810. For example, the processor 814 can perform the feature engineering functionalities described herein according to the process 700.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A system, comprising:
a non-transitory memory; and one or more hardware processors coupled with the non-transitory memory and configured to read instructions from the non-transitory memory to cause the system to perform operations comprising:

providing, on a device, a user interface based on graph data associated with a graph, wherein the graph represents transactions conducted among a plurality of accounts with a service provider;

receiving, via the user interface, a user input indicating (i) a graph traversal route comprising a number of hops from a seed vertex in the graph and (ii) a calculation based on attributes associated with one or more vertices along the graph traversal route;

determining, based on the user input, a feature candidate for a machine learning model, wherein the feature candidate specifies the graph traversal route and the calculation;

configuring the machine learning model to use the feature candidate as an input feature to perform a task, wherein the configuring the machine learning model comprises (i) generating programming code in a graph query language that performs the graph traversal route and the calculation and (ii) incorporating the programming code into the machine learning model;

in response to receiving a request to perform the task associated with an account with the service provider, generating, using the programming code incorporated into the machine learning model, an input value corresponding to the input feature for the machine learning model, wherein the generating the input value comprises (i) identifying a set of vertices in the graph based on traversing the graph from a vertex representing the account according to the graph traversal route, and (ii) performing the calculation based on a plurality of attributes associated with the set of vertices; and processing, by the machine learning model, the request based on the input value.

2. The system of claim 1, wherein the operations further comprise:

modifying a structure of the machine learning model based on the input feature.

3. The system of claim 2, wherein the machine learning model comprises an artificial neural network, and wherein the modifying the structure of the machine learning model comprises adding an input node to an input layer of the machine learning model.

4. The system of claim 3, wherein the programming code is incorporated into the input node of the input layer of the machine learning model.

5. The system of claim 1, wherein the operations further comprise:

performing a plurality of simulations on the feature candidate based on using different vertices in the graph as the seed vertex; and determining a correlation between the feature candidate and the task based on simulation results from the performing.

6. The system of claim 5, wherein the operations further comprise:

determining that the correlation exceeds a threshold, wherein the configuring the machine learning model to use the feature candidate as the input feature is in response to the determining that the correlation exceeds the threshold.

7. The system of claim 1, wherein the operations further comprise obtaining an output from the machine learning model based on at least the input value.

8. A method, comprising:

receiving, by one or more hardware processors and via a user interface of a device, a user interaction with a graphical element representing at least a portion of a graph associated with a service provider, wherein the graph represents transactions conducted among a plurality of accounts with a service provider, and wherein the user interaction specifies (i) a traversal route comprising a number of hops from a seed vertex in the graph and (ii) a calculation based on attributes associated with one or more vertices along the traversal route;

determining, by the one or more hardware processors and based on the user interaction with the graphical element, a feature candidate for a machine learning model, wherein the feature candidate specifies the traversal route and the calculation;

configuring, by the one or more hardware processors, the machine learning model to use the feature candidate as an input feature to perform a task, wherein the configuring the machine learning model comprises (i) generating programming code that performs the graph traversal route and the calculation and (ii) incorporating the programming code into the machine learning model;

in response to receiving a request to perform the task associated with an account with the service provider, generating, using the programming code incorporated into the machine learning model, an input value corresponding to the input feature for the machine learning model, wherein the generating the input value comprises (i) identifying a set of vertices in the graph based on traversing the graph from a vertex representing the account according to the traversal route, and (ii) performing the calculation based on a plurality of attributes associated with the set of vertices; and processing, by the machine learning model, the request based on the input value.

9. The method of claim 8, wherein the calculation is based on at least one of a sum, an average, a maximum, a minimum, or a count.

10. The method of claim 8, wherein the user interaction further specifies a type of edge to traverse from the seed vertex.

11. The method of claim 8, further comprising:

obtaining an output from the machine learning model based on at least the input value.

12. The method of claim 11, further comprising:

processing a transaction associated with the account with the service provider based on the output.

13. The method of claim 8, further comprising:

modifying a structure of the machine learning model based on the input feature.

14. The method of claim 13, wherein the machine learning model comprises an artificial neural network, and wherein the modifying the structure of the machine learning model comprises adding an input node to an input layer of the machine learning model.

15. A non-transitory machine-readable medium having stored thereon machine-readable instructions executable to cause a machine to perform operations comprising:

accessing, from a data storage, graph data associated with a graph, wherein the graph represents relationships among a plurality of user accounts with a service provider;

providing, on a device, a user interface based on the graph data;

receiving a user input via the user interface, wherein the user input is associated with (i) a graph traversal route comprising a number of hops from a seed vertex in the graph and (ii) a calculation based on attributes associated with one or more vertices along the graph traversal route;

determining, based on the user input, a feature candidate for a machine learning model, wherein the feature candidate specifies the graph traversal route and the calculation;

configuring the machine learning model to use the feature candidate as an input feature to perform a task, wherein the configuring the machine learning model comprises (i) generating programming code that performs the graph traversal route and the calculation and (ii) incorporating the programming code into the machine learning model;

in response to receiving a request to perform the task associated with a user account with the service provider, generating, using the programming code incorporated into the machine learning model, an input value corresponding to the input feature for the machine learning model, wherein the generating the input value comprises (i) identifying a set of vertices in the graph based on traversing the graph from a vertex representing the user account according to the graph traversal route, and (ii) performing the calculation based on a plurality of attributes associated with the set of vertices; and processing, by the machine learning model, the request based on the input value.

16. The non-transitory machine-readable medium of claim 15, wherein the operations further comprise:
modifying a structure of the machine learning model based on the input feature.

17. The non-transitory machine-readable medium of claim 16, wherein the machine learning model comprises an artificial neural network, and wherein the modifying the structure of the machine learning model comprises comprises adding an input node to an input layer of the machine learning model.

18. The non-transitory machine-readable medium of claim 16, wherein the programming code is incorporated into the input node of the input layer of the machine learning model.

19. The non-transitory machine-readable medium of claim 15, wherein the operations further comprise:
performing a plurality of simulations on the feature candidate based on using different vertices in the graph as the seed vertex; and
determining whether a correlation exists between the feature candidate and the task based on simulation results from performing the plurality of simulations.

20. The non-transitory machine-readable medium of claim 19, wherein the operations further comprise:
determining that the correlation exists between the feature candidate and the task based on the simulation results, wherein the configuring the machine learning model to use the feature candidate as the input feature is based on the correlation.

* * * * *